United States Patent [19]
Howrie

[11] Patent Number: 5,862,902
[45] Date of Patent: Jan. 26, 1999

[54] COMBINED COIL HOUSING AND SHAFT BEARING FOR AN ELECTROMAGNETIC FRICTION CLUTCH ASSEMBLY

[75] Inventor: William C. Howrie, Somerdale, N.J.

[73] Assignee: Dana Corporation, Toledo, Ohio

[21] Appl. No.: 743,922

[22] Filed: Nov. 5, 1996

Related U.S. Application Data

[63] Continuation of Ser. No. 369,401, Jan. 5, 1995, abandoned.
[51] Int. Cl.$^6$ .................................................. F16D 27/112
[52] U.S. Cl. .................................... 192/84.961; 192/113.5
[58] Field of Search .......................... 192/84.961, 84.96, 192/66.32, 110 B, 113.5

[56] References Cited

U.S. PATENT DOCUMENTS

| | | |
|---|---|---|
| Re. 30,609 | 5/1981 | Miller ..................................... 192/84 C |
| 2,788,324 | 4/1957 | Mitchell . |
| 2,899,036 | 8/1959 | Ryba . |
| 3,190,420 | 6/1965 | Kampf . |
| 3,381,784 | 5/1968 | Miller et al. ...................... 192/66.32 X |
| 3,381,785 | 5/1968 | Mendenhall . |
| 3,446,322 | 5/1969 | Wrensch ......................... 192/84.961 X |
| 3,854,562 | 12/1974 | Wilczewski ......................... 192/84.961 |
| 4,126,215 | 11/1978 | Puro ....................................... 192/84 C |
| 4,346,616 | 8/1982 | Geisslinger et al. ................... 192/84 C |
| 4,508,203 | 4/1985 | Packard et al. . |
| 4,664,238 | 5/1987 | Nishino et al. ..................... 192/84.961 |
| 5,038,905 | 8/1991 | Nakamura .............................. 192/84 C |
| 5,080,214 | 1/1992 | Fossum .............................. 192/84 C X |
| 5,148,902 | 9/1992 | Nakamura .......................... 192/84 C X |

OTHER PUBLICATIONS

Dana Drawing No. A–904–007 dated Mar. 27, 1985.

Primary Examiner—Rodney H. Bonck
Attorney, Agent, or Firm—MacMillan, Sobanski & Todd

[57] ABSTRACT

An electromagnetic friction clutch assembly includes an input gear which is supported directly on an output shaft for rotation relative thereto. The input gear is formed from a self-lubricating molded thermoplastic material, or a self-lubricating metallic material. An armature is rotatably supported on a tubular extension formed on the input gear. The armature is connected to the input gear for rotation therewith and for relative axial movement. A rotor plate is secured to the output shaft for rotation therewith. The armature is axially movable between an engaged position, wherein it frictionally engages the rotor disc, so as to cause the output shaft to be rotatably driven by the input gear, and a disengaged position, wherein it does not frictionally engage the rotor disc. A non-rotatable electromagnet is supported on the output shaft for selectively attracting the armature toward the rotor disc so as to engage the electromagnetic friction clutch assembly. The electromagnet includes an annular shell including an inner pole piece, which is hollow and cylindrical in shape, and an outer pole piece, which has a generally L-shaped cross section. The inner pole piece is disposed about the central portion of the output shaft, and the outer pole piece is press fit or otherwise secured to the inner pole piece. The inner pole piece is preferably formed from a self-lubricating magnetically permeable material. The inner pole piece can be formed from powdered metal which is sintered to form a relatively porous body. The porous body of the inner pole piece can then be impregnated with a suitable lubricant, such as an oil or a self-lubricating plastic.

14 Claims, 3 Drawing Sheets

COMBINED COIL HOUSING AND SHAFT BEARING FOR AN ELECTROMAGNETIC FRICTION CLUTCH ASSEMBLY

CROSS-REFERENCE TO RELATED APPLICATION

This application is a continuation of application Ser. No. 08/369,401, filed Jan. 5, 1995 and now abandoned.

BACKGROUND OF THE INVENTION

This invention relates in general to electromagnetically actuated friction clutch assemblies and in particular to an improved structure for a combined coil housing and shaft bearing for use in such an electromagnetic friction clutch assembly.

Electromagnetic friction clutch assemblies are well known devices which are commonly used to selectively connect a rotatably driven input member with an output member. The input member of a typical electromagnetic friction clutch assembly is usually embodied as an input gear, which meshes with and is constantly rotatably driven by a source of rotational power. The output member is usually embodied as a cylindrical shaft. The input gear is usually supported on the output shaft for rotation relative thereto. An armature, also rotatably supported on the output shaft, is connected to the input gear for rotation therewith and for relative axial movement. A rotor is secured to the output shaft for rotation therewith. The armature is axially movable between engaged and disengaged positions. In the engaged position, the armature frictionally engages the rotor so as to cause the output shaft to be rotatably driven by the input gear. In the disengaged position, the armature does not frictionally engage the rotor, and the output shaft is not rotatably driven by the input gear. A non-rotatable electromagnet is supported on the rotor for selectively attracting the armature toward the rotor so as to engage the electromagnetic friction clutch assembly such that the output shaft is rotatably driven by the input gear.

As noted above, the input gear and the output shaft of a conventional electromagnetic friction clutch assembly must be able to accommodate relative rotational movement. Also, the non-rotatable electromagnet must be supported on the rotatable rotor to accommodate relative rotational movement. Thus, it is known to provide conventional bearings in the electromagnetic friction clutch assembly for these purposes. Typically, the input gear of the electromagnetic friction clutch assembly is supported on the output shaft by a plurality of needle bearings, while the electromagnet is supported on the rotor by a sleeve bearing formed from a relatively low friction material. Additionally, a thrust bearing may be provided between the input gear and the rotor to accommodate axial forces which may be generated during operation.

While such mechanical bearings have been found to function satisfactorily, their presence requires that they occupy physical space within the electromagnetic friction clutch assembly. This results in a decrease in the amount of physical space which could be used by the other components of the electromagnetic friction clutch assembly to increase the torque capacity thereof. Also, the presence of these bearings can interfere with the magnetic field generated by the electromagnet when energized, thus also reducing the torque capacity of the electromagnetic friction clutch assembly. Accordingly, it would be desirable to provide an improved structure for an electromagnetic friction clutch assembly which does not require the use of mechanical bearings.

SUMMARY OF THE INVENTION

This invention relates to a structure for an electromagnetic friction clutch assembly which does not require the use of mechanical bearings. The electromagnetic friction clutch assembly includes an input gear which is supported directly on an output shaft for rotation relative thereto. The input gear is formed from a self-lubricating molded thermoplastic material, or self-lubricating metallic material. An armature is rotatably supported on a tubular extension formed on the input gear. The armature is connected to the input gear for rotation therewith and for relative axial movement. A rotor plate is secured to the output shaft for rotation therewith. The armature is axially movable between an engaged position, wherein it frictionally engages the rotor disc so as to cause the output shaft to be rotatably driven by the input gear, and a disengaged position, wherein it does not frictionally engage the rotor disc. A non-rotatable electromagnet is supported on the output shaft for selectively attracting the armature toward the rotor disc so as to engage the electromagnetic friction clutch assembly. The electromagnet includes an annular shell having a generally C-shaped cross section which is defined by an inner pole piece and an outer pole piece. The inner pole piece is hollow and cylindrical in shape, while the outer pole piece is formed having an L-shaped cross section. The inner pole piece of the shell is disposed about the central portion of the output shaft, and the outer pole piece is press fit or otherwise secured to the inner pole piece. The inner pole piece is preferably formed from a self-lubricating magnetically permeable material. The inner pole piece can be formed from powdered metal which is sintered to form a relatively porous body. The porous body of the inner pole piece can then be impregnated with a suitable lubricant, such as an oil or a self-lubricating plastic. Thus, the inner cylindrical surface of the non-rotatable inner pole piece can be supported directly on the rotatable output shaft, without the need for any intermediate mechanical bearing.

Various objects and advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
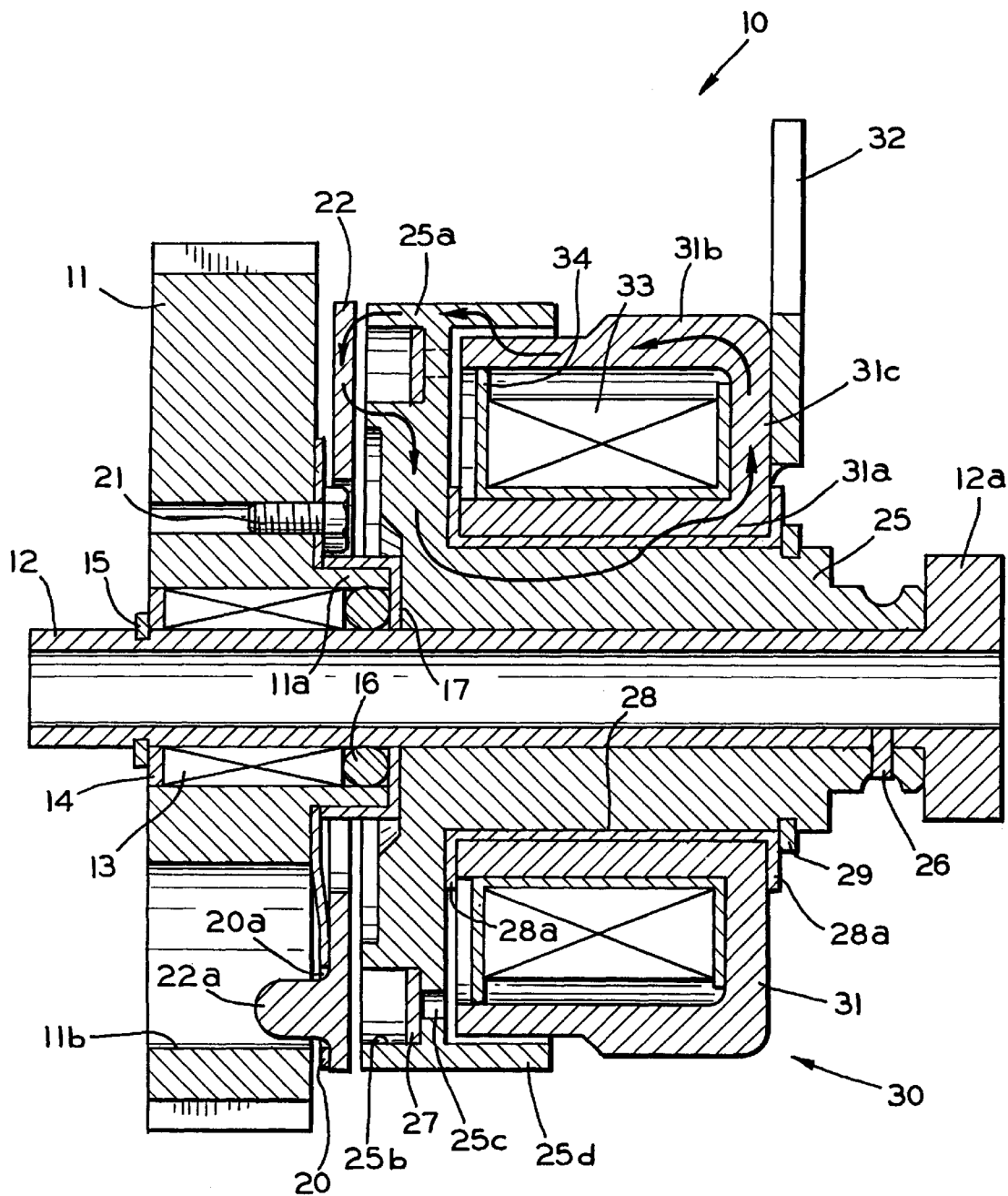
FIG. 1 is a sectional elevational view of a prior art electromagnetically actuated clutch assembly.

Referring now to the drawings, there is illustrated in FIG. 1 a prior art electromagnetically actuated friction clutch assembly, indicated generally at 10. Portions of the prior art clutch assembly 10 have been exaggerated in size to facilitate the understanding of the structure and operation thereof. The prior art clutch assembly 10 includes an input gear 11 which is rotatably mounted on an output shaft 12 by any conventional means, such as by a plurality of needle bearings 13. The output shaft 12 has an enlarged circumferential flange 12a formed at one end thereof, for a purpose which will be explained below. A seal 14 is provided at one end of the needle bearings 13 to retain lubricant and to prevent dirt and other contaminants from entering therein. The seal 14 is restrained from axial movement in one direction (toward the left when viewing FIG. 1) by a retaining ring 15 disposed in an outer circumferential groove formed in the output shaft 12. An elastomeric O-ring 16 or similar device is provided at the opposite end of the needle bearings 13 for the same purpose.

The input gear 11 is formed having an integral tubular extension 11a which extends axially from the center region thereof A cup-shaped bearing 17 is fitted over the axial end of the tubular extension 11a. The bearing 17 is preferably formed from a low-friction plastic material. A plurality of radially extending slots 11b are also formed through the input gear 11 near the peripheral region thereof The purposes of the tubular extension 11a, the cup-shaped bearing 17, and the slots 11b will be explained below.

A leaf spring 20 is provided about the tubular extension 11a adjacent to the input gear 11. The illustrated leaf spring 20 includes an inner annular hub having three equidistantly spaced aims (only one of which is shown) extending radially outwardly therefrom. The inner annular hub of the leaf spring 20 is secured to the axial face of the input gear 11 by a plurality of bolts 21 (only one of which is shown) for rotation therewith. The outermost ends of the radial arms of the leaf spring 20 have respective openings 20a formed therethrough to permit it to be connected to an annular armature plate 22, in a manner described further below. The armature 22 is supported on the tubular extension 11a of the input gear 11 by means of the low friction bearing 17. Thus, the armature 22 is capable of axial sliding movement toward and away from the input gear 11, as will be explained in detail below. The bearing 17, as described above, extends over the tubular extension 11a of the input gear 11 and provides a low friction surface upon which the armature 22 can slide axially.

The armature 22 is formed having a plurality of axially extending tabs, one of which is shown at 22a in FIG. 1. Each of the tabs 22a extends through a corresponding one of the openings 20a formed through the outermost ends of the radial arms of the leaf spring 20. Thus, the armature 22 is connected for rotation with the leaf spring 20 and, therefore, the input gear 11. At the same time, relative axial movement between the armature 22 and the input gear 11 is permitted. The tabs 22a further extend into respective ones of the axial slots 11b formed through the input gear 11 for clearance purposes. The armature 22 is formed of a magnetically permeable material. As used herein, the term "magnetically permeable material" means a material which has a magnetic permeability which is greater than air, such as iron, steel, nickel, cobalt, and the like.

A rotor 25 is disposed about the output shaft 12 and is secured for rotation therewith by a radially extending pin 26. The rotor 25 is generally hollow and cylindrical in shape, having a first axial end which abuts the cup-shaped bearing 17 disposed about the tubular extension 11a of the input gear 11. A second axial end of the rotor 25 abuts the enlarged circumferential flange 12a formed on the output shaft 12. As a result, the rotor 25 is supported on the output shaft 12 for rotation therewith and is restrained from axial movement relative thereto.

The rotor 25 is formed having an integral radial flange portion 25a located at the first axial end thereof, adjacent to the armature 22. An annular groove 25b is formed in the axial end surface of the flange portion 25a of the rotor 25, facing toward the armature 22. Several arcuate slots, one of which is shown at 25c, are formed through the flange portion 25a of the rotor 25, each communicating with the annular groove 25b. The slots 25c function to provide discontinuities in the magnetic flux path which would otherwise be established through the rotor 25, as will be described below. An annular dust shield 27 is disposed within the groove 25b to prevent dirt and other contaminants from entering into the prior art clutch assembly 10 through the groove 25b and the slots 25c. The dust shield 27 is formed from a non-magnetically permeable material. The flange portion 25a of the armature 25 further includes a hollow cylindrical lip 25d which extends axially away from the armature 22. The lip 25d thus forms an annular flange which extends axially over a portion of the cylindrical body of the rotor 25. The rotor 25 is also formed from a magnetically permeable material. The purposes of the flange 25a, the groove 25b, the slots 25c, and the lip 25d of the rotor 25 will be explained below.

A sleeve bearing 28 is disposed about the cylindrical portion of the rotor 25. The sleeve bearing 28 includes a hollow cylindrical central portion having radially outward extending flange portions 28a formed at both axial ends thereof One of the flange portions 28a is disposed adjacent the flange portion 25a of the rotor 25. The other flange portion 28a is disposed adjacent a retainer clip 29 disposed in a circumferential groove formed in the outer surface of the cylindrical portion of the rotor 25. The flange portions 28a of the sleeve bearing 28 function as thrust bearings to provide a low friction engagement of the components of the prior art clutch assembly 10 when axially loaded. Thus, the sleeve bearing 28 is retained on the cylindrical portion of the rotor 25 and restrained from axial movement relative thereto. The sleeve bearing 28 is typically formed from a self-lubricating, non-magnetic material, such as bronze or plastic.

A stationary annular electromagnet, indicated generally at 30, is disposed about the central portion of the sleeve bearing 28. The electromagnet 30 includes an annular shell 31 having a generally C-shaped cross section which is defined by an inner circumferential wall 31a, an outer circumferential wall 31b, and a radially extending wall 31c extending therebetween. The shell 31 is formed of a magnetically permeable material. The inner circumferential wall 31a of the shell 31 is disposed about the central portion of the sleeve bearing 28, extending between the two radially outward extending flange portions 28a. The electromagnet 30 is thus supported by the sleeve bearing 28 on the rotor 25. A rigid anti-rotation member 32 is secured to the shell 31 by any suitable means, such as by welding. The anti-rotation member 32 is connected to an external frame (not shown) or other suitable stationary component, so as to prevent the shell 31 (and, thus, the electromagnet 30 as a whole) from rotating during use. The electromagnet 30 further includes a coil 33 of an electrical conductor which is wound about a bobbin 34. The coil 33 and the bobbin 34 are disposed in the annular space defined between the inner and outer circumferential walls 31a and 31b of the shell 31. The bobbin 34 is secured to the shell 31 by conventional means to prevent relative rotation therebetween.

In operation, the input gear 11 is driven to rotate by an external drive mechanism (not shown). By virtue of the bolts 21 (which connect the leaf spring 20 to the input gear 11) and the cooperation of the tabs 22a with the openings 20a formed through the arms of the leaf spring 20 (which connect the armature 22 to the leaf spring 20), the armature 22 is driven to rotate with the input gear 11. The cup-shaped bearing 17 and the tubular extension 11a provided on the input gear 11 function to maintain an axial gap between the adjacent axial faces of the input gear 11 and the flange portion 25a of the rotor 25. Within this axial space, the armature 22 is axially slidable. However, as described above, the armature 22 is normally urged axially toward the input gear 11 and away from the flange portion 25a of the rotor 25 by the leaf spring 20. As a result, so long as the electromagnet 30 is de-energized, the leaf spring 20 maintains the armature 22 axially spaced apart from the flange portion 25a of the rotor 25. The rotor 25 and the output shaft 12 are thus disconnected from the rotating input gear 11 and armature 22 and, therefore, are not rotatably driven. The cup-shaped bearing 17 disposed over the tubular extension 11a of the input gear 11 does rotate therewith. However, as mentioned above, the cup-shaped bearing 17 is formed from a low friction material and, therefore, does not exert a sufficient drag force on the rotor 25 to cause it to rotate.

When the electromagnet 30 is energized, the coil 33 generates an electromagnetic field. The lines of flux of this electromagnetic field generally follow the path shown by the arrows in FIG. 1 to form a closed magnetic circuit. The manner in which the coil 33 is wound determines which end thereof is a magnetic north pole and which is a magnetic south pole. Thus, the direction of the lines of flux may be opposite to that indicated by the arrows. The magnetic flux follows the path of least reluctance to determine the magnetic circuit. Starting in the outer circumferential wall 31b of the shell 31, the lines of flux pass axially therethrough, then radially outwardly to the overlapping lip 25d of the rotor 25. The lines of flux continue axially through the lip 25d of the rotor 25 and across the air gap defined between the region of the flange portion 25a of the rotor 25 located radially outwardly of the groove 25b (referred to as the outer pole) and the armature 22. The lines of flux do not extend radially inwardly through the rotor 25 because of the presence of the slots 25c discussed above. The lines of flux then pass radially inwardly through the armature 22 and axially across the air gap again to the region of the flange portion 25a of the rotor 25 located radially inwardly of the groove 25b (referred to as the inner pole) and axially through the cylindrical portion of the rotor 25. From there, the lines of flux flow through radially outwardly through the sleeve bearing 28, the inner circumferential wall 31a of the shell 31, the radial wall 31c of the shell 31, and back into the outer circumferential wall 31b of the shell 31 to complete the magnetic circuit.

The electromagnetic field generated by the electromagnet 30 attracts the armature 22 toward the rotor 25. As a result, the armature 22 slides axially along the cup-shaped bearing 17 into frictional engagement with the flange portion 25a of the rotor 25 against the urging of the leaf spring 20. The frictional engagement of the rotatably driven armature 22 with the flange portion 25a of the rotor 25 causes the rotor 25 (and the output shaft 12 connected thereto) to rotate with the input gear 11. The sleeve bearing 28 provides a low friction means for supporting the stationary electromagnet 30 on the rotatable rotor 25. The flange portion 28a of the sleeve bearing 28 also prevents axial contact between the flange portion 25a of the rotor 25 and the inner circumferential wall 31a of the shell 31. However, because it is formed from a non-magnetically permeable material, the sleeve bearing 28 also forms a flux gap between the rotor 25 and the inner circumferential wall 31a of the shell 31, across which the lines of flux must extend in order to complete the magnetic circuit. This flux gap increases the overall reluctance of the magnetic circuit and, consequently, decreases the strength of the electromagnetic field which attracts the armature 22 into frictional engagement with the flange portion 25a of the rotor 25. Thus, a relatively stronger electromagnet 30 must be used to operate the prior art clutch assembly 10, resulting in increased cost.

Figure 2:
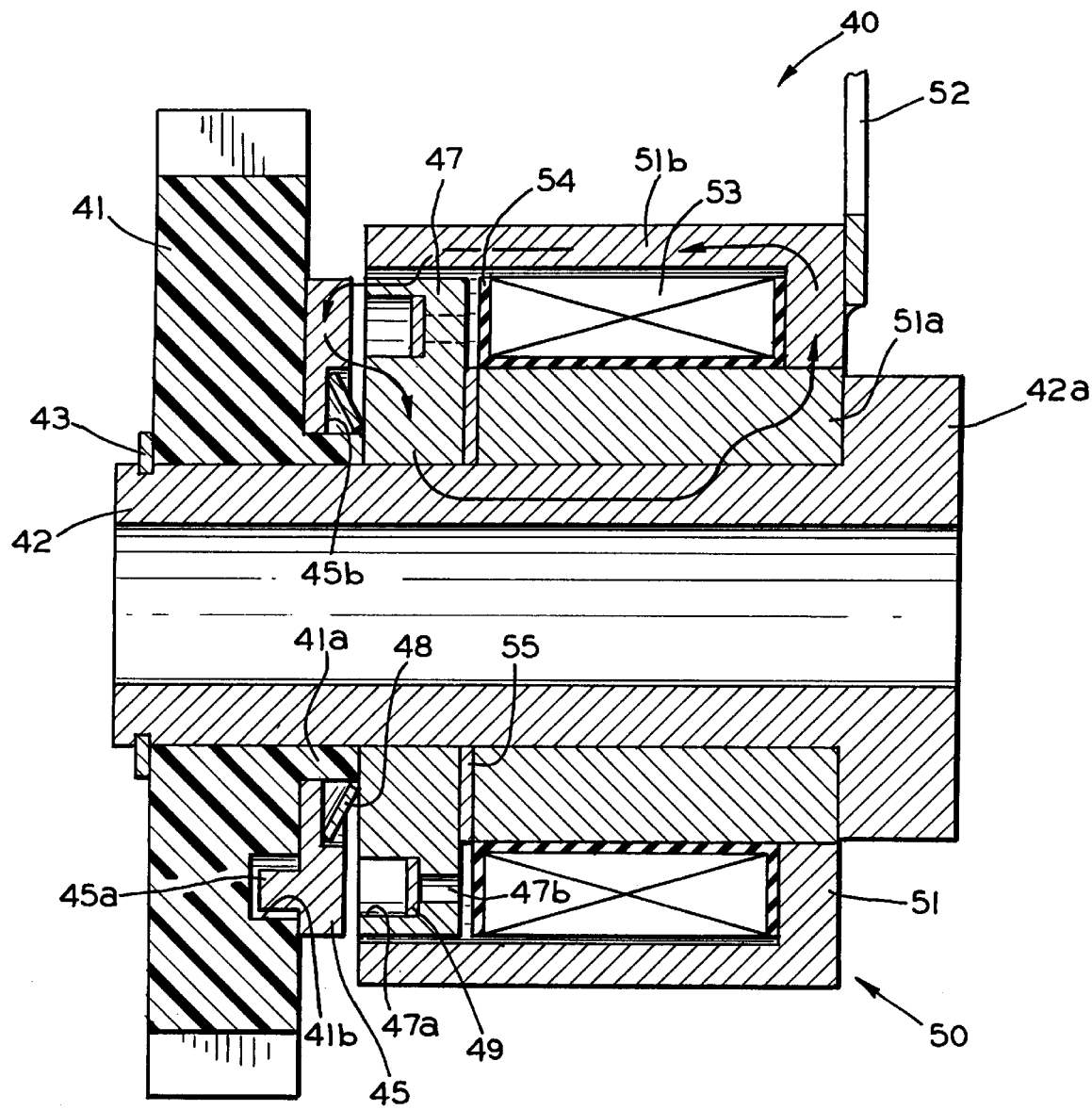
FIG. 2 is a sectional elevational view of a first embodiment of an electromagnetically actuated clutch assembly in accordance with this invention.

Referring now to FIG. 2, there is illustrated a first embodiment of an electromagnetic friction clutch assembly, indicated generally at 40, in accordance with this invention. Portions of the clutch assembly 40 have been exaggerated in size to facilitate the understanding of the structure and operation thereof. The clutch assembly 40 includes an input gear 41 which is rotatably mounted on a rotor shaft 42. Preferably, the input gear 41 is formed from a self-lubricating molded thermoplastic material, or self-lubricating metallic material such as bronze, to permit the input gear 41 to be journaled directly onto the rotor shaft 42. However, the input gear 41 may be rotatably mounted on the rotor shaft 42 by any conventional means, such as by a plurality of needle bearings as described above with respect to the prior art clutch assembly 10. The input gear 41 is formed having an integral tubular extension 41a which extends axially from the center region thereof. A plurality of recesses 41b are also formed in the axial face of the input gear 41 near the peripheral region thereof for a purpose which will be explained below. It will be appreciated that the recesses 41b may be formed as through slots if desired. The input gear 41 is restrained from axial movement in one direction (toward the left when viewing FIG. 2) by a retaining ring 43 disposed in an outer circumferential groove formed in the output shaft 42. The output shaft 42 has an enlarged circumferential flange 42a formed at one end thereof, for a purpose which will be explained below.

An annular armature 45 is disposed about the tubular extension 41a of the input gear 41. As indicated above, the input gear 41 is preferably formed from a self-lubricating material. As a result, the armature 45 is supported directly on the tubular extension 41a, and no bearing is required therebetween to facilitate relative axial movement. However, if the input gear 41 is formed from a material which lacks self-lubricating properties, a bearing similar to the cup-shaped bearing 17 described above may be disposed between the tubular extension 41a of the gear 41 and the armature 45. One of the axial faces of the armature 45 is formed having a plurality of axially extending tabs, one of which is shown at 45a in FIG. 2. Each of the tabs 45a extends into a respective one of the axial recesses 41b formed in the input gear 41. The armature 45 is, therefore, connected to the input gear 41 for rotation therewith and for axial movement relative thereto. The armature 45 is formed of a magnetically permeable material. A recess 45b is formed in the opposite axial face of the armature 45 for a purpose which will be explained below.

An annular rotor disc 47 is mounted on the rotor shaft 42 for rotation therewith. In the illustrated embodiment, the rotor disc 47 is press fit onto the rotor shaft 47. However, the rotor disc 47 may be secured to the rotor shaft 42 by any conventional means for concurrent rotation. The rotor disc 47 and the rotor shaft 42 are normally formed as separate components which are assembled together. However, the rotor disc 47 may be formed integrally with the rotor shaft 42 if desired. The rotor shaft 42 and the rotor disc 47 are both formed from a magnetically permeable material. A spring 48 is disposed about the tubular extension 41a of the input gear 41 between the armature 45 and the rotor disc 47. The illustrated spring 48 is a Belleville spring which is received in the recess 45b formed in the armature 45 and is preferably formed from a non-magnetically permeable material. The spring 48 reacts between the axially movable armature 45 and the axially stationary rotor disc 47. As a result, the armature 45 is urged axially toward the input gear 41 and away from the rotor disc 47. However, other spring structures may be used to urge the armature axially toward the input gear 41 and away from the rotor disc 47.

An annular groove 47a is formed in the axial end surface of the rotor disc 47, facing toward the armature 45. Several arcuate slots, one of which is shown at 47b, are formed through the rotor disc 47, each communicating with the annular groove 47a. The slots 47b are provided for the same purpose as the slots 25c discussed above. An annular dust shield 49 is disposed within the groove 47a to prevent dirt and other contaminants from entering into the clutch assembly 40 through the groove 47a and the slots 47b. The dust shield 49 is formed from a non-magnetically permeable material.

A stationary annular electromagnet, indicated generally at 50, is disposed about the central portion of the rotor shaft 42. The electromagnet 50 includes an annular shell 51 having a generally C-shaped cross section which is defined by an inner pole piece 51a and an outer pole piece 51b. The inner pole piece 51a is hollow and cylindrical in shape, while the outer pole piece 51b is formed having an L-shaped cross section. The shell 51 is formed of a magnetically permeable material. The inner pole piece 51a of the shell 51 is disposed about the central portion of the rotor shaft 42, adjacent to the enlarged circumferential flange 42a provided thereon. The outer pole piece 51b is press fit or otherwise secured to the inner pole piece 51a. A rigid anti-rotation member 52 is secured to the shell 51 by any suitable means, such as by welding. The anti-rotation member 52 is connected to an external frame (not shown) or other suitable stationary component, so as to prevent the shell 51 (and, thus, the electromagnet 50 as a whole) from rotating during use. The electromagnet 50 further includes a coil 53 of an electrical conductor which is wound about a bobbin 54. The coil 53 and the bobbin 54 are disposed in the annular space defined between the inner and outer pole pieces 51a and 51b of the shell 51. The bobbin 54 is secured to the shell 51 by conventional means to prevent relative rotation therebetween.

The inner pole piece 51a is journaled on the rotor shaft 52, between the enlarged circumferential flange 42a and the armature 45. The inner pole piece 51a is preferably formed from a self-lubricating magnetically permeable material. The inner pole piece 51a can be formed from powdered metal which is sintered to form a relatively porous body. The porous body of the inner pole piece 51a can then be impregnated with a suitable lubricant, such as an oil or a self-lubricating plastic. Thus, the inner cylindrical surface of the non-rotatable inner pole piece 51a can be supported directly on the rotatable rotor shaft 42, without the need for any intermediate bearing. The inner cylindrical surface of the inner pole piece 51a is closely fitted to the outer surface of the rotor shaft 42 so as to prevent relative radial movement therebetween.

One end of the inner pole piece ring 51a abuts the enlarged circumferential flange 42a of the rotor shaft 42. The other end of the inner pole piece 51a bears against an annular shim 55 disposed about the rotor shaft 42. The shim 55, in turn, abuts the axial face of the rotor disc 47. The shim 55 is formed of a non-magnetically permeable material, such as stainless steel, and is provided to reduce any magnetic attraction between the rotor disc 47 and the inner pole piece 51a. Thus, it can be seen that the input gear 41, the rotor disc 47, the shim 55, and the inner pole piece 51a are all supported on the rotor shaft 42 and are axially retained between the enlarged circumferential flange 42a and the retaining ring 43.

As described above, the inner pole piece 51a is a porous body which is impregnated with a lubricant. Therefore, the axial end surfaces of the inner pole piece 51a are also self-lubricating bearing surfaces. As a result, there is no need for thrust bearings similar to the flange portions 28a of the sleeve bearing 28 described above between the inner pole piece 51a and either the enlarged circumferential flange 42a of the rotor shaft 42 or the shim 55 and the rotor disc 47. This permits the inner pole piece 51a to be formed having a somewhat longer axial length than would otherwise be permitted if such thrust bearings were provided.

In operation, the input gear 41 is driven to rotate by an external drive mechanism (not shown). By virtue of the cooperation of the tabs 45a with the recesses 41b, the armature 45 is driven to rotate with the input gear 41. The tubular extension 41a provided on the input gear 41 functions to maintain an axial gap between the adjacent axial faces of the input gear 41 and the rotor disc 47. Within this axial space, the armature 45 is axially slidable. However, as described above, the armature 45 is normally urged axially toward the input gear 41 and away from the rotor disc 47 by the Belleville spring 48. As a result, so long as the electromagnet 50 is de-energized, the Belleville spring 48 maintains the armature 45 axially spaced apart from the rotor disc 47. The rotor shaft 42 is thus disconnected from the rotating input gear 41 and armature 45 and, therefore, is not rotatably driven. Even though the tubular extension 41a of the input gear 41 bears axially against the rotor disc 47, insufficient torque is transmitted to rotate the rotor disc 47 therewith because the input gear 41 is formed of a self-lubricating material, as discussed above.

When the electromagnet 50 is energized, the coil 53 generates an electromagnetic field. The lines of flux of this electromagnetic field generally follow the path shown by the arrows in FIG. 2 to form a closed magnetic circuit. The manner in which the coil 53 is wound determines which end thereof is a magnetic north pole and which is a magnetic south pole. Thus, the direction of the lines of flux may be opposite to that indicated by the arrows. The magnetic flux follows the path of least reluctance to determine the magnetic circuit. Starting in the outer circumferential wall of the outer pole piece 51b of the shell 51, the lines of flux pass axially therethrough, then radially inwardly across the air gap defined between the outer pole piece 51b and the region of the rotor disc 47 located radially outwardly of the groove 47a (referred to as the outer pole). The lines of flux then pass axially from the outer pole of the rotor disc 47 across the air gap to the armature 45, radially inwardly through the armature 22, and axially across the air gap again to the region of the rotor disc 47 located radially inwardly of the groove 47a (referred to as the inner pole). From there, the lines of flux pass radially inwardly into the rotor shaft 42, axially through the rotor shaft 42, radially outwardly through the inner pole piece 51a of the shell 51, and back into the outer pole piece 51b of the shell 51 to complete the magnetic circuit.

Figure 3:
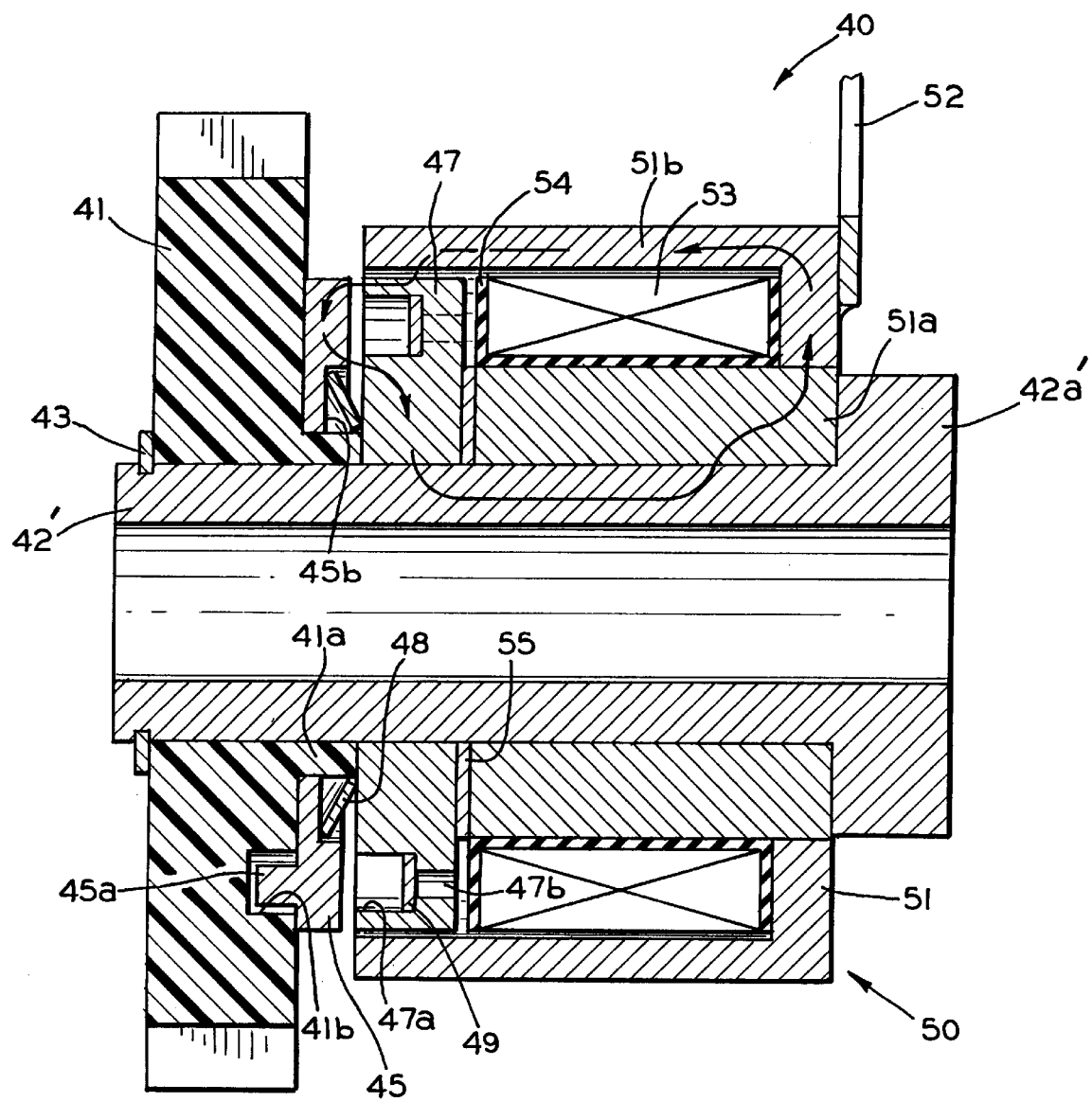
FIG. 3 is a sectional elevational view of a second embodiment of an electromagnetically actuated clutch assembly in accordance with this invention.

The electromagnetic field generated by the electromagnet 50 attracts the armature 45 toward the rotor disc 47. As a result, the armature 45 slides axially along the tubular extension 41a of the input gear 41 into frictional engagement with the rotor disc 47 against the urging of the Belleville spring 48. The frictional engagement of the rotatably driven armature 45 with the rotor disc 47 causes the rotor shaft 42 to rotate with the input gear 41. The self-lubricating properties of the inner pole piece 51a permit the shim 55 to freely rotate relative thereto without the need for an interposed bearing. Similarly, the self-lubricating inner pole piece 51a supports the electromagnet 50 upon the rotor shaft 42, while permitting the rotor shaft 42 to rotate freely relative thereto without the use of a bearing. If the rotor shaft 42 were formed from a non-magnetically permeable material, as shown at 42' and 42a' in the second embodiment of the invention illustrated in FIG. 3, then the lines of flux would be forced to flow through the non-magnetically permeable shim 55. The shim 55 is typically relatively thin, however, and would not increase the total reluctance of the magnetic circuit by a significant amount.

In accordance with the provisions of the patent statutes, the principle and mode of operation of this invention have been explained and illustrated in its preferred embodiment. However, it will be understood that this invention may be practiced otherwise than as specifically explained and illustrated without departing from its spirit or scope.

What is claimed is:

1. An electromagnetic friction clutch assembly comprising:
   a rotatable input member, said input member including a tubular extension which defines an outer cylindrical surface, and said input member being formed of a self-lubricating material;
   a rotatable output member formed from a non-magnetically permeable material and having an outer surface;
   a rotor formed from a magnetically permeable material and connected to said output member for rotation therewith;
   an armature formed from a magnetically permeable material and connected to said input member for rotational movement and for axial movement relative thereto between an engaged position, wherein said armature frictionally engages said rotor so as to rotatably drive said output member with said input member, and a disengaged position, wherein said armature does not frictionally engage said rotor, said armature having a single central opening formed therethrough defining an inner surface which engages said outer surface of said tubular extension of said input member to support said armature thereon; and
   a non-rotatable electromagnet for selectively generating a magnetic field to move said armature from said disengaged position to said engaged position, said electromagnet including a shell supporting a coil of an electrical conductor, said shell being formed from a magnetically permeable and self-lubricating material and having an inner surface which engages said outer surface of said output member to support said non-rotatable electromagnet on said rotatable output member.

2. The electromagnetic friction clutch assembly defined in claim 1 wherein said input member has an opening formed therethrough defining an inner surface which engages said outer surface of said output member to rotatably support said input member on said output member.

3. The electromagnetic friction clutch assembly defined in claim 1 wherein said output member includes a radially outwardly extending flange and wherein said shell includes an axial face which engages said flange of said output member.

4. The electromagnetic friction clutch assembly defined in claim 3 wherein shell is formed of a porous metallic material impregnated with a lubricant.

5. The electromagnetic friction clutch assembly defined in claim 1 wherein said output member includes a shaft portion and said rotor is an annular member which is press fit onto said shaft portion of said output member.

6. The electromagnetic friction clutch assembly defined in claim 1 further including a member formed from a non-magnetically permeable material which is disposed between said rotor and said shell, said shell including an axial face which engages said member to axially support said shell.

7. The electromagnetic friction clutch assembly defined in claim 6 wherein said non-magnetically permeable member is an annular shim.

8. The electromagnetic friction clutch assembly defined in claim 1 wherein said output member includes a radially outwardly extending flange and wherein said shell includes a first axial face which engages said flange of said output member to axially support said shell, and further including a member formed from a non-magnetically permeable material which is disposed between said rotor and said shell, said shell including a second axial face which engages said member to axially support said shell.

9. The electromagnetic friction clutch assembly defined in claim 8 wherein shell is formed from a porous metallic material impregnated with a lubricant.

10. The electromagnetic friction clutch assembly defined in claim 1 wherein shell is formed of a porous metallic material impregnated with a lubricant.

11. The electromagnetic friction clutch assembly defined in claim 1 wherein said shell includes an inner pole piece journaled on said output member and an outer pole piece disposed radially outwardly of said inner pole piece, said coil of said electrical conductor being wound about said inner pole piece.

12. The electromagnetic friction clutch assembly defined in claim 11 wherein said inner pole piece has an outer surface and said outer pole piece further includes a radially inwardly extending flange portion which engages said outer surface of said inner pole piece to radially support said outer pole piece on said inner pole piece.

13. The electromagnetic friction clutch assembly defined in claim 1 further including a spring reacting between said armature and said rotor for urging said armature toward said disengaged position.

14. The electromagnetic friction clutch assembly defined in claim 13 wherein said spring is a Belleville spring disposed about said tubular extension of said input member.

* * * * *